United States Patent [19]

Ninnemann et al.

[11] Patent Number: 4,648,068
[45] Date of Patent: Mar. 3, 1987

[54] MEMORY-PROGRAMMABLE CONTROLLER

[75] Inventors: Peter Ninnemann, Rottenbach; Dieter Wollscheid, Erlangen, both of Fed. Rep. of Germany

[73] Assignee: Siemens Aktiengesellschaft, Munich, Fed. Rep. of Germany

[21] Appl. No.: 568,106

[22] Filed: Jan. 4, 1984

[30] Foreign Application Priority Data

Jan. 28, 1983 [DE] Fed. Rep. of Germany ....... 3302929

[51] Int. Cl.⁴ .................. G06F 13/00; G06F 15/46; G05B 15/08
[52] U.S. Cl. .................. 364/900; 364/136
[58] Field of Search ... 364/131, 132, 136, 200 MS File, 364/900 MS File

[56] References Cited

U.S. PATENT DOCUMENTS

| | | | |
|---|---|---|---|
| 3,631,405 | 12/1971 | Hoff et al. | 364/200 |
| 3,921,146 | 11/1975 | Danco | 340/172.5 |
| 3,942,158 | 3/1976 | Dummermuth | 340/172.5 |
| 4,058,711 | 11/1977 | Ondercin et al. | 364/900 |
| 4,150,429 | 4/1979 | Ying | 364/200 |
| 4,161,024 | 7/1979 | Joyce et al. | 364/200 |
| 4,165,534 | 8/1979 | Dummermuth et al. | 364/900 |
| 4,245,307 | 1/1981 | Kapeghian et al. | 364/200 |
| 4,446,515 | 5/1984 | Sauer et al. | 364/200 |
| 4,459,655 | 7/1984 | Willemin | 364/200 X |
| 4,517,657 | 5/1985 | Schwefel | 364/900 |

FOREIGN PATENT DOCUMENTS 10170 9/1979 European Pat. Off. .

Primary Examiner—James D. Thomas
Assistant Examiner—Thomas C. Lee
Attorney, Agent, or Firm—Kenyon & Kenyon

[57] ABSTRACT

A memory-programmable multiprocessor controller having a word processor and a bit processor is disclosed. The word processor is coupled to a separate peripheral bus for providing communication with a peripheral module coupled to the process being controlled. An internal system bus separated from the peripheral bus provides communication between the bit processor, user program memory and data memory. The bit processor accesses the user program memory and the data memory via separate dedicated buses. Rapid command execution can thereby be achieved.

1 Claim, 1 Drawing Figure

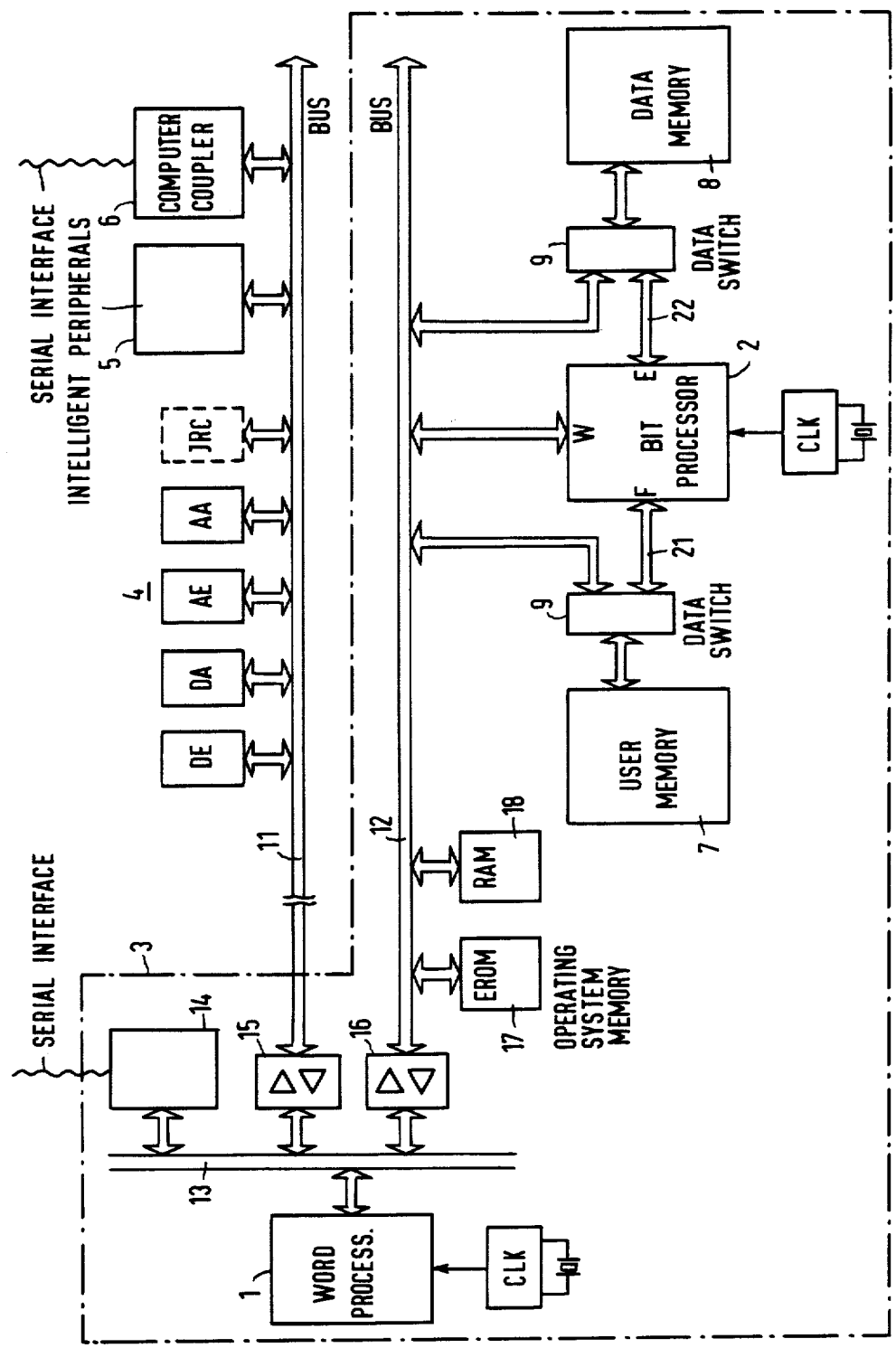

MEMORY-PROGRAMMABLE CONTROLLER

CROSS REFERENCE TO RELATED APPLICATIONS

This application is related to the following U.S. Patent Applications, each of which was filed on even date herewith and assigned to the assignee of the present application:

MEMORY-PROGRAMMABLE CONTROLLER, filed as Ser. No. 568,107 on Jan. 4, 1984, now U.S. Pat. No. 4,592,010, in the name of Dieter Wollscheid, and claiming priority of German Application No. P33 23 824.3 filed July 1, 1983;

MEMORY-PROGRAMMABLE CONTROLLER, filed as Ser. No. 568,104 on Jan. 4, 1984 in the names of Peter Ninnemann and Dieter Wollscheid, and claiming priority of German Application No. P33 02 902.4 filed Jan. 28, 1983;

MEMORY-PROGRAMMABLE CONTROLLER WITH WORD AND BIT PROCESSORS, filed as Ser. No. 568,105 on Jan. 4, 1984 in the names of Peter Ninnemann and Dieter Wollscheid, and claiming priority of German Application No. P33 02 940.2 filed Jan. 28, 1983;

MEMORY-PROGRAMMABLE CONTROLLER, filed as Ser. No. 568,115 on Jan. 4, 1984 in the names of Dieter Wollscheid, Peter Ninnemann, Siegfried Stoll and Waldemar Wenzel, and claiming priority of German Application No. P33 02 909.1 filed Jan. 28, 1983.

The disclosures of each of the above applications is hereby incorporated by reference.

BACKGROUND OF THE INVENTION

The present invention relates to the field of memory-programmable controllers for controlling peripheral processes and having cyclically traversed user control programs. In particular, the present invention relates to memory-programmatic controllers of the multi-processor type including a word processor for processing operating system and word commands, a bit processor for processing binary interlinking commands, an operating system memory in which an operating system program is stored, a user program memory in which the control program is stored, a data memory having binary process images stored therein, peripheral modules coupled to the process being controlled and buses for coupling the above-mentioned components.

Memory-programmable controllers are described in detail, for instance, in the journal Siemens Energietechnik 1979, no. 2, pages 43 to 47, no. 4, pages 136 to 139, in the journal Siemens Energietechnik 1980, no. 9, pages 360 to 363 and also in European Patent No. 10170 and U.S. Pat. Nos. 3,921,146 and 3,942,158.

A memory-programmable controller should preferably be able to perform logical linkages of data one bit wide as well as complex functions with word-wide data, for instance, arithmetic functions, data transfer, timing and counting processes. It is essential in this connection that purely binary linking commands are traversed very much more frequently than the more complex word oriented functions. The operating time of the overall program and therefore, the reaction time of the controller, depends considerably more on the execution time of the binary linking commands than on the processing time required for the more complex functions.

It is therefore advantageous to use, as the controller, a multiprocessor system, in which the execution of the binary commands is assigned to a separate fast bit processor, while a relatively slow word processor carries out the complex functions (see, for instance, the journal Siemens Energietechnik 1980, no. 9, page 361). In this known memory-programmable controller with a word and a bit processor, the input and output modules are also connected to the buses of the controller. Since these buses must therefore leave the process or modules and must possibly also go beyond the housing frame of the controller proper, relatively long bus running times and thereby, relatively long command execution times result.

SUMMARY OF TIME INVENTION

It is an object of the present invention to provide a memory-programmable multiprocessor controller of the type mentioned above which minimizes the running time of the overall program.

This and other objects of the present invention are achieved in a memory-programmable controller of the type having a cyclically traversed user control program for controlling a peripheral process including a word processor for processing operating system and word commands, a bit processor for processing binary interlinking commands, an operating system memory wherein an operating system program including the operating system commands is stored, a user program memory wherein the control program including the word and interlinking commands is stored, a data memory wherein binary process images of the process being controlled are stored, at least one peripheral module for providing a signal path to the controlled process and at least one bus for coupling the above-mentioned components, wherein the improvement comprises: peripheral bus means coupling the word processor with the peripheral module and for providing communication between the word processor and the peripheral module; internal system bus means coupling the word processor, the bit processor and each of the memories for providing communication thereamong, communication between the peripheral module and the data memory being exclusively through the word processor; separate bus means respectively coupling the bit processor with the user program memory and the data memory, the separate bus means providing the exclusive means of communication between the bit processor and the user program memory and data memory respectively; the bit processor being responsive to word commands from the control program memory so as to go into a hold state if a word command is recognized in the control program, the bit processor including means for controlling the word processor so that the word processor executes the word command, the word processor including means for restarting the bit processor after executing the word command.

By decoupling the bit processor and the internal system bus of the word processor from the peripheral equipment, commands can be executed very quickly and the overall processing time of the control program can be shortened.

So that the running time of the program is not increased too much due to the exchange of the process images between the periphery and the data memory required at the control program cycle limits, it is furthermore advantageous that the binary signals coming from the process signal formers of the peripheral modules be transmitted word-wide, i.e., for instance, as words 8 bits wide, via the peripheral and internal system buses.

BRIEF DESCRIPTION OF THE DRAWINGS

The invention will be explained in greater detail with reference to the single drawing figure in which the block diagram of one embodiment of the memory-programmable controller is shown.

DETAILED DESCRIPTION

With reference now to the drawing, the central unit 3, shown by the dashed lines, of the memory-programmable controller, which processes the signals coming from the peripheral units 4 in accordance with the given user control program, comprises substantially a word processor 1 and a bit processor 2. The word processor 1 is a conventional microprocessor, and is organized, for instance, to handle words 8 bits wide, and serves for executing the complex functions requiring word-wide data. Among such functions are, for instance, arithmetic operations, data transfer, timing and/or counting processes. The word processor 1 controls and addresses the so-called peripheral bus 11 which is connected to its internal bus 13 via a driver stage 15. To this peripheral bus 11 are connected the input and output stages 4 from and to the process under control, intelligent peripherals 5 such as distance and velocity evaluation modules and coupling components 6 for connecting to a computer.

The word processor 1 is coupled via internal bus 13 to a serial interface 14, by which a connection to a programming and testing device can be established, as well as to a second bus, internal system bus 12, via driver stage 16. Bus 12 does not leave the processor module and therefore is very fast An operating system memory 17 containing tne operating system program for the word processor, and which illustratively comprises eraseable read-only memory is coupled to the internal system bus 12. A working memory 18 which illustratively is a random access memory is also coupled to bus 12. The word processor further has access via system bus 12 to the bit prdcessor 2 and, via data switches 9, also to the pluggable user program memory 7 wherein the control program is stored and the data memory 8 containing the process images. The controller processes only the process images of the input and output signals of the peripheral modules 4, and interchanges the process images with the peripheral process under control at the ends of the control program cycle.

The fast bit processor 2 has access via data switches 9 to the user program memory 7 and the data memory 8 exclusively via respective buses 21 and 22. The bit processor 2 reads the commands of the user control program stored in the user program memory 7 and manipulates the process images according to the binary linking commands read from memory 7, i.e., it processes the binary data in the data memory 8. If the bit processor 2 encounters a word command in reading the user control program, it stops and makes available to the word processor the information necessary for processing the word command, and advantageously in such a manner that an entry address into a corresponding program section is made available to the word processor for executing the command. When the word command is executed, optionally while accessing the user program memory 7 and the data memory 8, the word processor 1 restarts the bit processor 2, which then continues to process the user program. The word processor is thus not occupied by long bus running times on the periphery while it fetches commands and during other operations.

The word processor 1 also has the task of providing for the data transfer between the peripheral modules 4 and the data memory 8, i.e., for reading in tne process signals to update the process images and for reading out the process images after control program processing is completed at the end of each program cycle. For this purpose, it uses the peripheral bus 11 and the internal system bus 12. In order to keep the time as short as possible for the data interchange, the process signals from the peripheral modules 4 are organized one word wide (for instance, as 8 bits), so that several binary signals which correspond, for instance, to switch positions "on", "off", are transmitted simultaneously.

The word processor 1 further has the task of processing operating system functions, such as start-up routines, self-diagnosis, coupling to the programming and testing device via the serial interface 14 and testing and start-up functions.

The word processor 1 treats the bit processor 2 like an intelligent peripheral module. Since the user program memory 7 as well as the data memory 8 can be addressed by both processors, the word processor 1 must stop the bit processor 2 in the event it must access one of these two memories. Both processors can be operated clock-synchronized and can be synchronized internally by the bit processor, if required.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. In a memory-programmable controller of the type having a cyclically traversed user control program for controlling a peripheral process including a word processor for processing operating system and word commands, a bit processor for processing binary interlinking commands, an operating system memory wherein an operating system program including the operating system commands is stored, a user program memory wherein the control program including the word and interlinking commands is stored, a data memory wherein binary process images of the process being controlled are stored, at least one peripheral module for providing a signal path to the controlled process and at least one bus for coupling the above-mentioned components, the improvement comprising:

peripheral bus means coupling the word processor with the peripheral module and for providing communication between said word processor and said peripheral module;

internal system bus means coupling the word processor, the bit processor and each of said memories for providing communication thereamong, communication between said peripheral module and said data memory being exclusively through said word processor;

separate bus means respectively coupling said bit processor with said user program memory and said data memory, said separate bus means providing the exclusive means for communication between the bit processor and said user program memory and data memory, respectively;

said bit processor receiving word commands from the control program in the user program memory and going into a hold state if a word command is recognized in said control program in said user program memory, said bit processor including means for controlling said word processor so that the word processor executes the word command, said word processor including means for restarting said bit processor after executing said word command, communication between said data memory and said peripheral module through said word processor being organized in parallel bit groups; and further comprising:

means for coupling said peripheral bus means to an external computer.

* * * * *